Sept. 29, 1959     G. O. CONNER     2,906,563
ANTI-FRICTION DIE SET
Filed Dec. 22, 1955
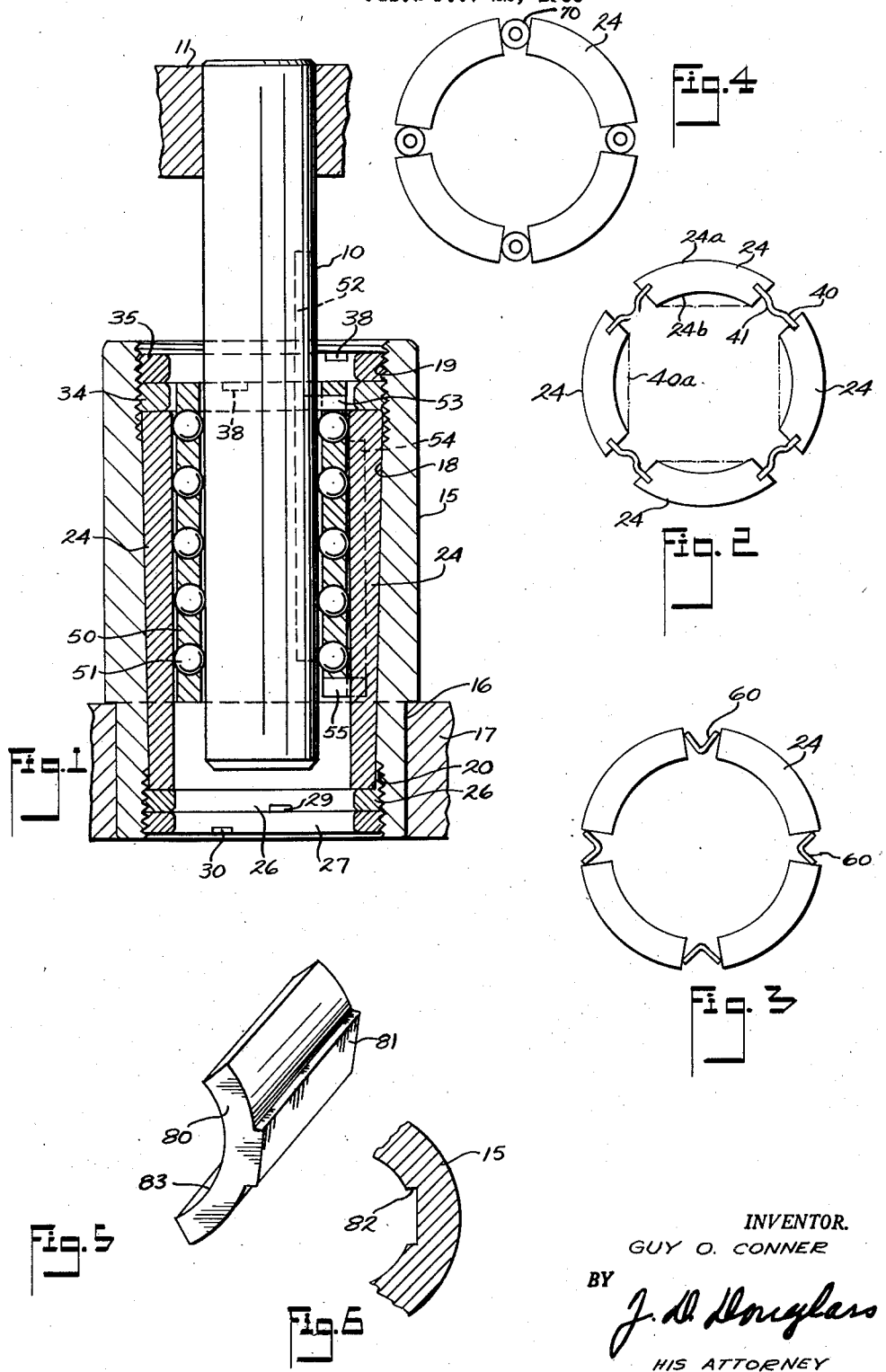
INVENTOR.
GUY O. CONNER
BY
J. D. Douglass
HIS ATTORNEY

United States Patent Office 2,906,563
Patented Sept. 29, 1959

2,906,563

ANTI-FRICTION DIE SET

Guy O. Conner, Cleveland Heights, Ohio

Application December 22, 1955, Serial No. 554,781

12 Claims. (Cl. 308—6)

This invention relates to improvements in die sets and more particularly in die sets such as illustrated in my Patents Nos. 2,422,774 and 2,422,775.

As illustrated and described in said patents my die sets included a sleeve or guide carried by one plate of the die set and a leader pin carried by the other plate. The wall of the leader pin is in spaced relation to the wall of the guide and anti-friction bearings were disposed in the space to provide for guiding engagement between the two. It was desirable that the bearings be slightly larger than the space between the leader pin and guide in order that, when the two were assembled the bearings would be under loaded conditions. The loading of the bearings is somewhat difficult and it is most desirable that the amount of loading be within a certain range. Too much loading would cause excessive wear and not enough would prevent the desired alignment. It can be seen therefore that the manufacturing tolerances as to the size of the pin and the diameter of the bore were somewhat critical and once determined there was nothing that could be done about it other than to select different sizes of bearings which was not economically a practical matter.

By the present invention I am able to provide a die set of the class described wherein a greater tolerance as to pin and guide sleeve bores may be had and still enable an exact amount of loading of the bearings to be obtained. Furthermore, I can vary the loading to cause it to be heavy or light as desired and to increase the loading as wear occurs if desired.

Briefly the invention contemplates the use of a guide sleeve which forms a housing for inner guiding segments wherein the inner segments have a longitudinally tapered wall in engagement with an oppositely tapered wall on the housing and wherein longitudinal adjustment of the segments in the housing increases the combined wall thickness of the housing and segments to enable the loading to be accurately determined.

Still other advantages of the invention and the invention itself will become more apparent from the following description of an embodiment thereof, which description is illustrated by the accompanying drawings and forms a part of this specification.

In the drawings:

Fig. 1 is a view of a leader pin guide and bearing retainer in section with a leader pin in elevation;

Fig. 2 is a plan view of the leader pin guide segments removed from the housing and showing in dashed lines an alternate form of bearing surface;

Fig. 3 is a similar view of the segments with a different form of spacer;

Fig. 4 is a similar view showing another form of spacer;

Fig. 5 is an isometric view of another form of segment; and

Fig. 6 is a fragmentary section of a modified form of housing.

Referring to the drawings, throughout which like parts are designated by like reference characters and particularly to Fig. 1, I have illustrated a leader pin 10 secured in an upper plate 11 of a die set.

A guide housing is provided and comprises a cylindrical sleeve 15 having an end 16 of reduced size, secured in a lower die set plate 17. The housing has a tapered inner wall 18, to provide an inner wall surface that slants inwardly toward the axis from the top to the bottom. The degree of taper may vary from that shown depending upon the degree of adjustment that is desired.

The upper and lower ends are internally threaded at 19 and 20.

The housing is adapted to support a plurality of guide segments 24, each of which comprises a substantially semi-cylindrical plate having the outer wall 24a tapered in the same direction to that of the housing to provide a complementary face for engagement with the housing and having an inner wall 24b which is truly semi-cylindrical.

At the lower end of the housing the thinner ends of the segments rest on a ring 26 engaged in the threads 20 of the housing and locked in place by a lock ring 27. The rings may be provided with diametrically opposed notches 29 in the ring 26 and 30 in the ring 27 for engagement by a spanner wrench whereby the upper ring may be adjusted as to height in the housing and the lower ring may be tightened to lock the upper ring.

At the upper end of the housing the upper ends of the segments are engaged by an upper positioning ring 34 and locked by a lock ring 35 each having spanner wrench notches 38 for adjusting purposes.

It is apparent that the rings 26 and 34 may be moved by rotating them in their threaded engagement with the threads 20 and 19, respectively, to vary the longitudinal position of the rings with respect to the bore, and thus the longitudinal position of the segments in the tapered bore may be varied. Once the position of the segments is determined the rings 27 and 35 may be rotated to lock them against the rings 26 and 34 and thus retain the assembly in adjusted position.

As is best illustrated in Fig. 2, the segments are held in evenly spaced relation during assembly by metal inserts 40, each of which is comprised of an elongated sheet metal strip, the edges of which are engaged in grooves in the edges of the segments and the center of which is provided with a bowed portion 41. Preferably these inserts are made of a metal which is readily bendable transversely of their length, which is assisted by the curved part 41 allowing the opposed edges of the segments to move closer together as the segments are moved downwardly in the housing and normally forcing them apart if they should be moved upwardly.

The inserts also maintain the segments in position during assembly.

The usual bearing retainer 50 is provided in this instance carrying a plurality of balls 51 which engage between the inner walls of the segments and the outer surface of the leader pin.

The leader pin is provided with the usual longitudinally extending groove 52 which receives a pin 53 carried by the bearing retainer at the upper end. One of the segments may be grooved at 54 for most of its length and receives a pin 55 carried by the lower end of the retainer. The combination of pins and grooves described maintain alignment of the bearing retainer with the segments preventing rotation of the same relative to each other.

It will thus be seen that the tapered walls of the housing and segments, together with the supporting and locking rings enable the effective wall thickness of the assembly to be varied within reasonable limits to enable the loading of the bearings between the leader pin and the segments to be varied within wide limits.

Although I have shown the invention as being particularly adapted for use with round leader pins and guides it also lends itself readily to use with square pins and guides as shown in my Patent No. 2,422,775. In Fig. 2 the dashed lines 40a illustrate a planar wall for the inner face of the segments which is the only change needed for use with square leader pins.

In Fig. 3 I have illustrated another form of separator for the segments which comprises V shaped members 60 engaged between the opposed edge walls of the segments. These strips are likewise made of a bendable material and provide the same feature as described for the strips 40.

In Fig. 4 I have shown still another form of separator for the segments, being in the form of a deformable tube 70. It performs in a like manner.

It will be noted that the edges of the segments in Figs. 3 and 4 are not parallel walls as shown in Fig. 2 but diverge outwardly. This prevents the separators from creeping inwardly where they might interfere with the bearings in the retainer or the retainer itself, although normally it is contemplated that there be no bearings at the space between the edges of the segments and that the pin and groove connection between the bearing retainer and leader pin and the bearing retainers and segments prevent any rotational movement.

I also contemplate another form of segment which is capable of an even wider range of adjustment and wherein the pin and groove connection between the bearing retainer is not needed. This form of segment is illustrated in Fig. 5 and comprises the semi-cylindrical bearing engaging part 80 having a bearing engaging surface 83 and a land or boss 81 on the opposite side from the bearing surface running longitudinally for its length. This boss is flat and engages in a flat groove or seat in the housing 15. The wall of the segment 80 tapers in the usual manner and thus provides a tapered surface for the land which engages in the groove 82.

It will be appreciated, however, that the land itself could be tapered either expedient providing an outer inclined surface for engagement with an oppositely inclined surface on the housing which causes the bearing engaging surface to move inward when the segment is moved downward in the housing.

Having thus described my invention I am aware that numerous and extensive departures may be made therefrom without departing from the scope of the invention as defined in the appended claims.

I claim:

1. A die set including a leader pin and a leader pin guide, anti-friction bearing means comprising a bearing retainer and bearings carried thereby interposed between the leader pin and guide and movable longitudinally therebetween said guide comprising a housing, an adjustable bearing engaging surface in the housing for engagement with the bearings adjustable to vary the loading on the bearings.

2. A die set including leader pin and a leader pin guide, anti-friction means comprising a retainer and anti-friction means carried thereby and movable longitudinally between the pin and guide said guide including a housing a plurality of bearing surfaces disposed therein and means on the housing for moving the bearing surfaces inwardly of the housing to adjust the degree of loading on the anti-friction means.

3. A die set including a leader pin and a leader pin guide with anti-friction means comprising a retainer and anti-friction means carried thereby interposed and movable longitudinally between the leader pin and guide, said guide including a housing, segmental members having surfaces disposed in the housing and means connected to the housing for moving said members longitudinally in the housing to move the bearing surfaces inwardly of the housing.

4. A die set including a leader pin and a leader pin guide having anti-friction bearing means comprising a bearing retainer with bearings carried thereby interposed and movable longitudinally therebetween, said guide comprising a housing having a tapered bore, a plurality of segments each having a bearing engaging surface and having an outer wall that tapers in the same direction to the housing wall and means to adjustably support said segments in the housing.

5. A device as described in claim 4 where said adjustment means comprises housing engaging members disposed at the upper and lower ends of the segments.

6. A device as described in claim 4 where said segments are formed to provide longitudinally extending spaces between their opposite edges.

7. A device as described in claim 4 where said segments are formed to provide longitudinally extending spaces between their opposite edges and means is provided between said edges to resiliently move the segments outward.

8. A device as described in claim 4 where said segments are formed to provide longitudinally extending spaces between their opposite edges and means is provided between said edges to resiliently move the segments outward and adjustment means is connected to said housing above and below said segments for adjustably supporting the segments in the housing.

9. A die set comprising a leader pin and a leader pin guide with anti-friction bearing means interposed between the leader pin and guide, said guide including a housing having an inner wall surface which slants inwardly from one end toward the other, a plurality of segments for seating engagement on said inner wall surface each of which is formed with an inner bearing engaging surface, the wall of each segment being formed to provide an outer housing engaging surface which slants in the same direction as the housing surface, said housing being formed with internally threaded upper and lower ends, retaining units for supporting said segments, and locking means engaging said threaded ends for locking said retaining units.

10. A device as described in claim 9 where said segments are formed to provide longitudinally extending spaces between their opposite edges.

11. A device as described in claim 9 where said segments are formed to provide longitudinally extending spaces between their opposite edges and bendable means engaging the edges of said segments for resiliently holding them in spaced relation to each other.

12. A device as described in claim 9 where said segments are formed to provide longitudinally extending spaces between their opposite edges and bendable means engaging the edges of said segments for resiliently holding them in spaced relation to each other and locking means is carried by said anti-friction bearing means and engaging with said leader pin and at least one of said segments for maintaining alignment of the bearings with the segments.

References Cited in the file of this patent

UNITED STATES PATENTS

| | | |
|---|---|---|
| 141,986 | Sullenberger | Aug. 19, 1873 |
| 1,109,642 | Buxton | Sept. 1, 1914 |
| 2,595,482 | Palumbo | May 6, 1952 |